US009637681B2

(12) United States Patent
Badel et al.

(10) Patent No.: US 9,637,681 B2
(45) Date of Patent: May 2, 2017

(54) AGENT FOR INHIBITING THE SWELLING OF CLAYS, COMPOSITIONS COMPRISING SAID AGENT AND METHODS IMPLEMENTING SAID AGENT

(71) Applicant: RHODIA OPERATIONS, Aubervilliers (FR)

(72) Inventors: Thierry Badel, Lyons (FR); Arnaud Cadix, Saint-Ouen (FR)

(73) Assignee: RHODIA OPERATIONS, Aubervilliers (FR)

( * ) Notice: Subject to any disclaimer, the term of this patent is extended or adjusted under 35 U.S.C. 154(b) by 114 days.

(21) Appl. No.: 14/377,363

(22) PCT Filed: Feb. 12, 2013

(86) PCT No.: PCT/EP2013/052775
§ 371 (c)(1),
(2) Date: Aug. 7, 2014

(87) PCT Pub. No.: WO2013/120844
PCT Pub. Date: Aug. 22, 2013

(65) Prior Publication Data
US 2015/0041138 A1   Feb. 12, 2015

(30) Foreign Application Priority Data

Feb. 14, 2012 (FR) ..................................... 12 51359

(51) Int. Cl.
| | |
|---|---|
| *C09K 8/68* | (2006.01) |
| *C09K 8/035* | (2006.01) |
| *C09K 8/60* | (2006.01) |
| *C09K 8/28* | (2006.01) |
| *E21B 7/00* | (2006.01) |
| *E21B 43/26* | (2006.01) |

(52) U.S. Cl.
CPC .............. *C09K 8/68* (2013.01); *C09K 8/035* (2013.01); *C09K 8/28* (2013.01); *C09K 8/607* (2013.01); *E21B 7/00* (2013.01); *E21B 43/26* (2013.01); *C09K 2208/12* (2013.01)

(58) Field of Classification Search
CPC .......... C09K 8/035; C09K 8/28; C09K 8/607; C09K 8/68; C09K 2208/12; E21B 43/26; E21B 7/00

USPC .................... 507/129, 251; 166/308.2, 305.1
See application file for complete search history.

(56) References Cited

U.S. PATENT DOCUMENTS

| | | | |
|---|---|---|---|
| 2,909,404 A | | 10/1959 | Dithmar et al. |
| 3,034,983 A | * | 5/1962 | Reiddie .................... C09K 8/28 507/113 |
| 5,197,544 A | | 3/1993 | Himes |
| 5,395,585 A | | 3/1995 | Goldstein |
| 5,771,974 A | | 6/1998 | Stewart et al. |
| 6,247,543 B1 | | 6/2001 | Patel et al. |
| 2002/0155956 A1 | * | 10/2002 | Chamberlain ........... C09K 8/12 507/100 |
| 2006/0289164 A1 | | 12/2006 | Smith et al. |
| 2007/0207932 A1 | | 9/2007 | Merli et al. |
| 2011/0226127 A1 | | 9/2011 | Dingler et al. |

FOREIGN PATENT DOCUMENTS

| | | |
|---|---|---|
| FR | 2185745 B1 | 1/1976 |
| FR | 2986797 A1 | 8/2013 |
| FR | 2986798 B1 | 1/2014 |
| GB | 1341167 A | 12/1973 |
| RU | 2303047 C1 | 7/2007 |
| WO | 9855733 A1 | 12/1998 |
| WO | 2006013595 A1 | 2/2006 |
| WO | 2008005415 A1 | 1/2008 |
| WO | 2011083182 A | 7/2011 |

OTHER PUBLICATIONS

Tam et al, "Electrostatic Interactions between Organic Ions", J. Chem. Soc. Farad. Trans. 1, vol. 80, Nov. 14, 1984, pp. 2255-2267.*
L. Diop et al, "Bis(triphenyltin)oxalate", Appl. Organomet. Chem., (Apr. 8, 2003), vol. 17, pp. 881-882, XP002685129.

* cited by examiner

*Primary Examiner* — Frances Tischler
(74) *Attorney, Agent, or Firm* — Vorys, Sater, Seymour and Pease LLP

(57) ABSTRACT

The present invention concerns the use of a novel additive as an agent for inhibiting the swelling of clays, in particular in the field of boreholes. More specifically, the present invention concerns the use of a specific diamine and diacid salt as an agent for inhibiting the swelling of clays in an aqueous medium, and a drilling or hydraulic fracturing fluid composition comprising the salt according to the invention and methods for drilling or hydraulic fracturing implementing said salt.

9 Claims, No Drawings

AGENT FOR INHIBITING THE SWELLING OF CLAYS, COMPOSITIONS COMPRISING SAID AGENT AND METHODS IMPLEMENTING SAID AGENT

This application is a U.S. national stage entry under 35 U.S.C. §371 of International Application No. PCT/EP2013/052775, filed Feb. 12, 2013, which claims priority to French Application No. 1251359, filed on Feb. 14, 2012. The entire content of each of these applications is hereby incorporated herein.

The subject matter of the present invention is the use of a novel additive as a clay-swelling inhibitor, especially in the field of drilling. More specifically, the present invention is targeted at the use of a specific salt of diamine and of diacid as an inhibitor of the swelling of clays in an aqueous medium, and also at a drilling fluid composition or hydraulic fracturing fluid composition comprising the salt according to the invention and at drilling or hydraulic fracturing processes employing the said salt.

BACKGROUND

During well drilling operations, especially when drilling wells intended for recovering underground oil and/or gas fields, use is made of drilling fluids intended to lubricate, clean and cool the drilling tools and the drilling head, and/or to discharge the material broken off during drilling (cleared rocks or cuttings). Drilling fluids are also used for cleaning the well. They also provide the pressure necessary for supporting the well wall before consolidation. The fluids are usually referred to as "drilling muds". After drilling, the well walls are generally consolidated with a cement material.

During the drilling of wells, in particular during the drilling of wells intended for the production of oil and/or gas, drilling is often carried out through argillaceous rocks, in particular through shales.

The problems posed by argillaceous formations are well known. When these formations are penetrated by drilling using water-based drilling fluids, complex chemical reactions occur within the argillaceous structure by ion exchange and hydration.

These reactions result in a swelling of the clays, a disintegration or a dispersion of the argillaceous particles of the formation passed through by the drilling.

This swelling of the clays poses problems not only in the drilling walls but also in the drilling fluid and in the reservoir rock.

The expression "reservoir rock" is understood to mean the rock formation that contains the oil and/or gas to be extracted.

Due to the hydration of the clays, dispersed particles contaminate the drilling fluid and the reservoir rock, and the disintegration is detrimental to the stability of the well walls. The swelling of these clays also causes operational problems by interfering with the flow of the fluid or the passage of the drilling tool.

Along the well walls, the swelling creates protuberances, which interferes with the movement of the drilling fluid and of the drilling tools. Furthermore, the swelling may result in disintegration, creating bumps along the walls. These bumps and protuberances may create points of mechanical weakness in the well.

In the drilling fluid, the disintegrated argillaceous material is released into the fluid and presents problems of viscosity control of the fluid: the argillaceous materials, especially in the presence of a high concentration of salts (brine), have a tendency to greatly increase the viscosity. This increase in viscosity becomes detrimental and, if it is too high, the drilling tools are damaged. The well may even be rendered unusable.

Furthermore, the cleared argillaceous rocks may have a tendency to aggregate together in the drilling fluid ("bit-balling" phenomenon). Generally, it is referred to as an accretion phenomenon. The accretion may interfere with the movement of the fluids and of the tools. They may furthermore adhere to and aggregate together around the drilling head and thus block it.

The problem presented by the swelling of the clays during drilling in argillaceous formations is closely linked to the phenomena of clay/drilling fluid interactions, especially during clay-water contact.

PRIOR ART/PROBLEMS

In the field of oil exploitation, the problems mentioned above have especially been solved using non-aqueous drilling fluids, for example a fluid in which the continuous phase is based on a liquid hydrocarbon. But drilling with these types of "oil-base" muds has many drawbacks: prohibitive cost of the fluid, toxicity and especially pollution by the oil of the effluents and debris resulting from the drilling. Current regulations relating to waste disposal henceforth result in treatment costs and techniques such that the oil-base mud is very often impossible to use.

Thus, currently, research and development are essentially focused on aqueous systems in order to find additives that limit the clay-swelling phenomena. These additives are referred to as "clay-swelling inhibitors" and they aim to prevent the penetration of the fluid into the rocks along the walls, into the suspended cleared rocks, and to inhibit swelling and/or disintegration.

Among these additives, there are in particular the following:

mineral salts ($KCl$, $NaCl$, $CaCl_2$, etc.), of which $KCl$ is certainly the salt most commonly used for inhibiting the swelling of clays. Indeed, the potassium ion is a good inhibitor which reduces the electrostatic repulsions between the sheets of clay and therefore the swelling of the clays. Although the $Na^+$ ion is not as good an inhibitor as the $K^+$ ion, the use of $NaCl$ is also widespread, especially in combination with silicates, polyols or methyl glucosides. Other solutions of mineral salts, such as $CaCl_2$, or $CaBr_2$, $ZnCl_2$, $MgCl_2$ or $MgBr_2$ and $ZnBr_2$ are also widely used as a swelling inhibitor. However, it is increasingly sought to avoid the use of these compounds in the field since inorganic salts, especially chloride salts, have a deleterious effect on the cements used for consolidating the well walls, organic monoacid salts, especially dissolved alkali metal formates or alkali metal acetates of formula $RCOO^-M^+$ with R=H or $CH_3$ and $M^+=Na^+$, $K^+$ or $Cs^+$, diamine salts, as described in patent application US 2006/0289164, the counterion of which is a monoacid such as formic acid, a mineral acid, or another acid such as a hydroxy acid (malic or citric acid); and more particularly the salts of hexamethylenediamine with a mineral acid such as hydrochloric acid or a monofunctional organic acid such as formic acid, as described in patent application US 2002/0155956, polymers intended for consolidating the walls ("well bore consolidation"). Thus use is currently made of partially hydrolysed polyacrylamides (PHPAs). Patent FR 2185745 describes such a use. These polymers form a polymeric film at the surface of the walls, encapsulate the cleared rocks, and thus inhibit the hydration of the clays. The performances of these polymers are however limited, since they have a tendency to make the fluids too viscous at high concentration. The performances of these polymers are furthermore limited under high-temperature high-pressure (HTHP) drilling conditions due to their limited hydrolytic stability. Moreover, these polymers degrade during their use due to their low shear resistance. Replacement solutions are therefore needed.

Increasingly restrictive legislations aim to limit the use and/or the risk of disposal of products that are dangerous for humans or for the environment. Sooner or later, in some countries, it will no longer be possible to use such corrosive additives, e.g. hexamethylenediamine, or additives which are likely to send irritant and/or corrosive products into the atmosphere, for instance hydroxyl acids or formic acid, in the event of excessive acidification of a drilling mud. Replacement solutions are therefore needed.

Therefore, there is still a need to provide clay-swelling inhibitors that perform even better in their application, and that are less dangerous for humans or for the environment.

BRIEF DESCRIPTION OF THE INVENTION

For this purpose, the present invention provides for the use, as an agent which inhibits the swelling of clays in an aqueous medium, of a salt of diamine and of dicarboxylic acid, the dicarboxylic acid corresponding to the following formula I:

HOOC-A-COOH (I)

in which A is a covalent bond or a saturated or unsaturated and linear or branched divalent aliphatic hydrocarbon group, the main linear chain of which, which extends between the two COOH ends, exhibits a number of carbons ranging from 1 to 3.

The present invention also relates to a drilling fluid composition or hydraulic fracturing fluid composition, characterized in that it comprises at least one salt of diamine and of diacid according to the invention, a liquid carrier and optionally additives dissolved or dispersed in the liquid carrier.

Finally the present invention relates to a drilling process in which use is made, in at least one step, of a drilling fluid composition according to the invention and a hydraulic fracturing process in which use is made, in at least one step, of a hydraulic fracturing fluid composition according to the invention.

DETAILED DESCRIPTION OF THE INVENTION

Use

The invention makes use of a salt of diamine and of dicarboxylic acid, the dicarboxylic acid of which, known as "diacid", corresponds to the formula I above.

In this formula, A is a covalent bond or a saturated or unsaturated, linear or branched divalent aliphatic hydrocarbon group, the main linear chain of which, which extends between the two COOH ends, exhibits a number of carbons ranging from 1 to 3.

It will be understood that A is not interrupted by heteroatoms and does not carry other functional groupings (other than the two carboxylic acid functional groups at the chain end of the formula I), either on its main chain or on the possible branched groupings. It will also be understood that A is not cyclic.

Preferably, when A is a branched aliphatic group, the branched grouping(s) exhibit(s) a number of carbons ranging from 1 to 3. Preferably, a methyl or an ethyl is concerned.

Advantageously, when A is a branched aliphatic group, it comprises at most two branched groupings, preferably just one.

Mention may be made, as examples of A groupings acceptable according to the invention, of:

—$(CH_2)_n$—, with n being an integer ranging from 1 to 3,
—$CH(CH_3)$—$(CH_2)_m$—, with m being an integer ranging from 0 to 2,
—$C(CH_3)_2$—$(CH_2)_o$—, with o being an integer ranging from 0 to 2,
—$CH(CH_2CH_3)$—$(CH_2)_p$—, with p being an integer ranging from 0 to 2,
—$CH=C(CH_3)$—$(CH_2)_q$— (cis or trans), with q being equal to 0 or 1,
—$CH=CH$—$(CH_2)_r$ (cis or trans), with r being equal to 0 or 1,
—$C(=CH_2)$—$(CH_2)_n$—, with s being an integer ranging from 0 to 2,
—$CH_2$—$CH(CH_3)$—$CH_2$—,
—$CH_2$—$C(CH_3)_2$—$CH_2$—,
—$CH_2$—$CH(CH_2CH_3)$—$CH_2$—.

According to one advantageous embodiment, the diacid of the invention is chosen from malonic acid, succinic acid, glutaric acid, methylmalonic acid, dimethylmalonic acid, ethylmalonic acid, mesaconic acid, methylsuccinic acid, ethylsuccinic acid, maleic acid, fumaric acid, itaconic acid, methylglutaric acid and glutaconic acid.

Preferably, the diacid is chosen from malonic acid, succinic acid, glutaric acid, methylmalonic acid, dimethylmalonic acid, ethylmalonic acid, methylsuccinic acid, ethylsuccinic acid and methylglutaric acid.

More preferably still, the diacid is chosen from succinic acid, glutaric acid and methylglutaric acid.

The salt of diamine and of dicarboxylic acid according to the invention also makes use of a diamine.

According to an advantageous form, the diamine is a primary diamine of the following formula II:

$H_2N$—$Z$—$NH_2$ (II)

in which Z is a saturated or unsaturated and linear or branched divalent aliphatic or cycloaliphatic hydrocarbon group, optionally interrupted by heteroatoms, the main chain of which, which extends between the two $NH_2$ ends, exhibits a number of carbons of less than or equal to 12, preferably ranging from 4 to 12.

The term "interrupted by heteroatoms" will be understood as meaning that the chain can be interrupted by one or more atoms chosen from N, S, O or P, preferably an N.

Preferably, when Z is a branched (cyclo)aliphatic group, the branched grouping(s) exhibit(s) a number of carbons of less than or equal to 3. Preferably, a methyl or an ethyl is concerned.

Advantageously, when Z is a branched (cyclo)aliphatic group, it comprises at most two branched groupings, preferably just one.

Mention may be made, as examples of Z groupings acceptable according to the invention, of:
—$(CH_2)_{n'}$—, with n' being an integer ranging from 2 to 12, preferably from 4 to 12, —CH(CH$_3$)—(CH$_2$)$_{m'}$—, with m' being an integer ranging from 1 to 11, —C(CH$_3$)$_2$—(CH$_2$)$_{o'}$—, with o' being an integer ranging from 1 to 11, —CH(CH$_2$CH$_3$)—(CH$_2$)$_{p'}$—, with p' being an integer ranging from 1 to 11, —CH=C(CH$_3$)—(CH$_2$)$_{q'}$— (cis or trans), with q' being an integer ranging from 0 to 10, —CH=CH—(CH$_2$)$_{r'}$— (cis or trans), with r' being an integer ranging from 0 to 10, —CH$_2$—CH(CH$_3$)—(CH$_2$)$_{s'}$—, with s' being an integer ranging from 0 to 10, —CH$_2$—C(CH$_3$)$_2$—(CH$_2$)$_{t'}$—, with t' being an integer ranging from 0 to 10, —CH$_2$—CH(CH$_2$CH$_3$)—(CH$_2$)$_{u'}$—, with u' being an integer ranging from 0 to 10, (CH$_2$)$_{v'}$—NH—(CH$_2$)$_{w'}$—, with v' and w' being identical or different integers ranging from 1 to 6, and v'+w' being less than or equal to 12,

with x being an integer ranging from 1 to 4.

More preferably, the diamine is chosen from the following diamines: diaminoethane, 1,2-diaminopropane, 1,3-diaminopropane, 1,4-diaminobutane, 1,5-diaminopentane, 2-methylpentamethylenediamine, N-(2-aminoethyl)-1,3-propanediamine, 1,2-diaminocyclohexane, 1,4-diaminocyclohexane, 1,6-diaminohexane, bis(3-aminopropyl)amine, 1,7-diaminoheptane, 1,8-diaminooctane, 1,10-diaminodecane, 1,12-diaminododecane and bis(hexamethylene)triamine.

More preferably still, the diamine is chosen from the following diamines: 1,4-diaminobutane, 1,5-diaminopentane, 2-methylpentamethylenediamine, N-(2-aminoethyl)-1,3-propanediamine, 1,2-diaminocyclohexane, 1,4-diaminocyclohexane, 1,6-diaminohexane, bis(3-aminopropyl)amine, 1,7-diaminoheptane, 1,8-diaminooctane, 1,10-diaminodecane, 1,12-diaminododecane and bis(hexamethylene)triamine.

According to one particularly preferred embodiment, the diamine is chosen from 2-methylpentamethylenediamine and hexamethylenediamine (1,6-diaminohexane).

According to an alternative form of the use according to the invention, the salt is a mixed salt of diamines and diacids, at least one of the diacids of which being as defined above. The term "mixed salt" is understood to mean a salt of at least two different diacids and of one or more diamines. For example, it can be a salt between a mixture of diacids, such as succinic acid, glutaric acid and adipic acid, and a diamine, such as hexamethylenediamine. It can also be a salt between a mixture of diacids, such as methylglutaric acid and ethylsuccinic acid, and a diamine, such as 2-methylpentamethylenediamine.

The use, as an inhibitor of the swelling of clays in an aqueous medium, of the salt of diamine and of dicarboxylic acid according to the invention is advantageously a use in an aqueous medium being a drilling fluid or hydraulic fracturing fluid.

Composition

Embodiments described herein also target a drilling fluid composition or hydraulic fracturing fluid composition.

Despite the differences that exist between these two ground stimulation techniques, they have a certain number of common points in terms of composition of the fluids used and in particular, the inhibition of the swelling of clays by the fluids used by these two techniques is necessary.

Drilling Fluids

Drilling fluids are known to those skilled in the art. The exact composition of the fluid can depend on the purpose of the fluid. It can depend in particular on the temperatures and pressures to which the fluid will be subjected, on the nature of the rocks through which the well passes, and on the nature of the drilling equipment.

Generally, the drilling fluid, also called drilling mud, is a liquid and/or gaseous system comprising additives. The main roles of the drilling fluid are:

ensuring that the cuttings rise from the bottom of the well up to the surface, keeping the cuttings in suspension during a shutdown of circulation for the purpose of preventing the sedimentation of the cuttings in order to restart the drilling without blockage, this being possible owing to the thixotropic nature of the fluid, cooling and lubricating the tool to avoid premature wear of the moving metal parts, supporting the well walls due to the hydrostatic pressure exerted by the drilling mud and making it possible to control the inflow of fluids from the rock formations passed through.

The mud should be neither corrosive nor abrasive for the equipment, nor toxic or dangerous for the personnel and it should not present a fire risk.

In the drilling fluids, the rheological and filtration properties are often adjusted by additives. The nature of the electrolytes and their concentration in the mud formulations are chosen by taking into account the characteristics of the formation.

Among the additives considered to be important for drilling fluid compositions, are clay-swelling inhibitors.

Hydraulic Fracturing Fluids:

Hydraulic fracturing is a technique widely used by the oil and gas industry to improve the exploitation of low-permeability reservoirs. The fracturing fluid is pumped to the bottom of the well at high flow rates and high pressures so that the pressure exerted generates fractures in the reservoir rock.

The principle thereof is therefore simple: a pressurized fluid is injected into the rock so as to break it and open fractures through which hydrocarbons will be able to flow to the well.

The implementation of the principle is more complex: it is necessary to add various additives to the injected fluid in order to prevent the fractures from closing up as soon as the pressure decreases at the end of the injection operation.

To keep the fractures open during injection, the additive commonly used is a proppant.

Use is made, for example, of ceramic beads, calibrated sand grains which will penetrate into the fractures so that they remain open. In general, a thickener is added to the fracturing fluid so that the proppant particles are entrained into the fractures during the injection and do not form a sediment at the bottom of the well. This sedimentation would be particularly prejudicial in the case of horizontal wells.

Most rock formations contain fine particles of clays and more particularly in the case where the reservoir rocks are of argillaceous nature, the water of the fracturing fluid will swell the clays which will limit the permeability of the network of fractures to the passage of the hydrocarbons. Furthermore, during the fracturing operation, clay particles referred to as "clay fines" can be detached from the walls and then clog, at least partially, the interstices between the particles of proppant ("proppant pack") and therefore considerably reduce the production of the well. There is therefore, in the case of hydraulic fracturing fluid compositions, also a need to add additives in order to prevent the swelling of the clays.

The drilling fluid composition or hydraulic fracturing fluid composition according to the invention is characterized in that it comprises at least one salt of diamine and of diacid according to the invention, a liquid carrier and optionally additives dissolved or dispersed in the liquid carrier.

The salt of diamine and of diacid according to the invention is as defined above in the description and it acts as clay-swelling inhibitor.

The content of clay-swelling inhibitor in the drilling or fracturing fluid composition is advantageously from 0.01% to 10% by weight, preferably from 0.1% to 5%, and more preferably still from 0.3% to 3%.

Conventionally, liquid drilling fluids are "water-based" or "oil-based". Oil-based muds are more expensive than water-based muds, but may be preferred in the case of drilling very deep wells (HP/HT (high pressure/high temperature) drilling conditions). The salt of diamine and of diacid according to the invention can be used with both types of carriers. However, water-based carriers (water-based mud) are preferred. The liquid carrier is preferably water or an oil-in-water emulsion.

The drilling fluid composition or hydraulic fracturing fluid composition according to the invention advantageously comprises additives dissolved or dispersed in the liquid carrier. They may be chosen, in particular, from:
 viscosifiers, in particular synthetic polymers;
 filtrate reducers, for example chosen from starches or modified starches, carboxymethyl celluloses (CMCs), polyanionic celluloses (PACs), or resins;
 clay-swelling inhibitors other than the salt of diamine and of diacid according to the invention, such as for example KCl, glycerol, silicates or various polymers such as partially hydrolysed polyacrylamide (PHPA) and polyalkylene glycols (PAGs).

Advantageously, the drilling fluid composition according to the invention comprises, in addition, at least one additive dissolved or dispersed in the liquid carrier, chosen from:
 i) viscosifiers, for example natural clays (often bentonites), synthetic polymers or biopolymers;
 ii) filtrate reducers that are used to consolidate the filter cake in order to limit the invasion of the rock by the drilling fluid such as for example starches and modified starches, carboxymethyl celluloses (CMCs), polyanionic celluloses (PACs), or resins;
 iii) other inhibitors of the swelling and dispersion of clays such as for example KCl, glycerol, silicates or various polymers such as partially hydrolysed polyacrylamide (PHPA) and polyalkylene glycols (PAGs);
 iv) weighting agents such as barite (barium sulphate $BaSO_4$) and calcite (calcium carbonate $CaCO_3$) which are the most widely used for providing the mud with a suitable density. The use of hematite ($Fe_2O_3$) or of galena (PbS) is also noted.

If necessary, it is also possible to use clogging agents such as for example granular agents (nutshells), fibrous agents (sugar cane, wood fibres) and lamellar agents (oyster shells, cereals).

Furthermore, other additives can be incorporated into the composition of the drilling fluid. Thus, mention can be made of free radical transfer agents, biocides, chelating agents, surfactants, antifoams, corrosion inhibitors, for example.

The hydraulic fracturing fluid composition generally comprises a liquid carrier that is preferably an aqueous fluid, additives dissolved or dispersed in the liquid carrier and a proppant. The proppant is chosen depending on the geological nature of the formation and the type of hydrocarbon to be produced, preferably from sands, ceramics and from polymers, which are optionally treated.

Among the additives which can be incorporated into the hydraulic fracturing fluid composition, are:
 i) viscosifiers such as for example synthetic polymers, especially polyacrylamide and polyacrylamide copolymers or biopolymers such as guar gum and modified guar gum or surfactants that form organized phases of giant micelle type;
 ii) crosslinking agents such as borates or zirconates that make it possible to impart viscoelastic rheology to the fluid;
 iii) other inhibitors of the swelling and dispersion of clays such as for example KCl, glycerol, silicates or various polymers such as partially hydrolysed polyacrylamide (PHPA) and polyalkylene glycols (PAGs);
 iv) friction reducers such as polyacrylamides and polyacrylamide copolymers of very high molar mass;
 v) agents that make it possible to clean the fractures just after their formation such as oxidants or enzymes which will degrade the polymers used for the rheological control or the friction reduction during the pumping of the fracturing fluid.

The fracturing fluid composition according to the invention can, in addition, comprise agents that make it possible to buffer the pH, bactericides, surfactants or filtrate reducers.

Processes

Embodiments herein are also directed to a drilling process in which use is made, in at least one step, of a drilling fluid composition as described previously.

The drilling operations generally are comprised of excavating a hole using a bit, attached to hollow pipes screwed end to end. Usually, the mud is initially formulated in a manufacturing tank available on the platform where the various ingredients are mixed with the base fluid of the mud comprising additives in aqueous solution, and is injected into the string of pipes throughout the whole period of drilling advance. This mud subsequently comes back up via the borehole, outside the pipes, and carries along rock components detached during the drilling operation. The mud is subsequently extracted from the drilling hole in order to be stripped of the rocks that it contains, usually by screening or centrifugation, before being reinjected into the hollow drilling pipes.

Embodiments herein are also directed to a hydraulic fracturing process in which use is made, in at least one step, of a hydraulic fracturing fluid composition as described previously.

The hydraulic fracturing is carried out by fracturing the rock via a mechanical stress using a fluid injected under high pressure from a surface drilling, in order to increase the macroporosity and to a lesser extent the microporosity thereof.

Hydraulic fracturing involves the injection of the hydraulic fracturing fluid under high pressure into the reservoir rock in order to propagate fractures therein, which makes it possible to facilitate the production of the hydrocarbons that are found therein.

The fracturing operation is carried out either just after the excavation of the well in order to initiate the production phase thereof, or after a certain operating time when the production tends to decline. Hydraulic fracturing is, for example, carried out as follows:
1. In the zone to be fractured, fractures are initiated by a perforating gun (through a perforated casing).
2. The drilling fluid, previously formulated in surface equipment, is pumped under high pressure.
3. Proppants are added to the fracturing fluid either throughout the whole fracturing operation or, more frequently, when the progression of the fracture is sufficient to introduce this proppant therein.
4. When the progression of the fracture is judged to be satisfactory, the injection is interrupted and the well is kept dormant while the oxidants or enzymes injected with the fluid degrade the polymers (rheological agents or friction reducers).
5. The well is then put back into production.

Measurements

Viscosity and Yield Point

The drilling or fracturing fluids have a typical Bingham fluid behaviour characterized by two main parameters, on the one hand the viscosity under flow or plastic viscosity denoted by PV and expressed in centiPoise (cP or m·Pa·s) and on the other hand the yield point denoted by YP (Pa).

These parameters are determined experimentally, using an AR2000 rheometer (TA Instruments, Surrey, Great Britain), equipped with a geometry of grooved plate/plate type having a diameter of 40 mm with a gap of 1 mm. The rheometer is used to carry out a shear rate sweep between 1 and 1000 s$^{-1}$ at 25° C. The stress ($\tau$) is plotted as a function of the shear rate ($\dot{\gamma}$) and the plastic viscosity and yield point values are determined using the Bingham equation below, adapted for fluids at yield:

$$\tau = YP + PV \times \dot{\gamma}$$

The adjustment of the experimental curves and the determination of the experimental values of YP and PV are carried out using Rheology Advantage Data Analysis V5.7.0 data processing software supplied by TA Instruments.

Gelling Limit

The clay-swelling inhibitor effect of an additive is determined by evaluating its impact on the swelling, in a given volume of fluid, of variable amounts of standardized clay referred to as API clay (API standing for American Petroleum Institute which standardises the characteristics of test clays in Recommended Practice for Drilling Fluid Materials, API Specifications 13A 16th edition February 2004).

The maximum value of clay that can be introduced, referred to as the gelling limit, is the maximum mass of clay that can be dispersed in 100 ml of fluid containing the swelling inhibitor while retaining a free volume of fluid. Beyond this value, the clay occupies the whole volume of fluid and gelling is observed.

The gelling limit is determined after 4 hours of rest at ambient temperature preceded by a hydration time of the clay in the fluid of 16 h at a temperature of 60° C. During this hydration period, the samples are agitated in a roller oven that makes it possible to avoid the sedimentation of the clay, therefore ensuring a homogeneous hydration throughout the sample. This method of sample homogenization is commonly referred to as hot-rolling in the oil industry.

Other details or advantages of the invention will become more clearly apparent in view of the non-limiting examples below.

EXAMPLES

The aliphatic diamines used are 2-methylpentane-1,5-diamine, 99.6%, Rhodia (MPMD), and 1,6-hexamethylene-diamine, 100%, Rhodia (HMD).

AGS, Rhodia, is a mixture of adipic acid (15-35%), glutaric acid (40-60%) and succinic acid (10-25%).

Example 1

Preparation of a Clay-Swelling Inhibitor 82.2 g of HMD (0.707 mol) and 10 g of water are introduced with stirring into a 500 ml four-necked round-bottomed glass flask provided with a mechanical stirrer, a temperature probe, a dropping funnel and a condenser.

The temperature of the medium is brought to 50° C. using an electric heating mantle. A stoichiometric amount of succinic acid (83.5 g, i.e. 0.707 mol) is subsequently added very gradually and alternatively with water (87 g) in order to ensure its dissolution while controlling the exothermicity of the reaction.

At the maximum, the reaction medium is brought up to 108° C. The reaction medium is clear.

The reaction medium is subsequently cooled in an ice bath. The salt crystallizes. 100 ml of ethanol are finally added in order to cause more salt to precipitate. The salt is filtered off and washed with ethanol and then dried in an oven at 60° C. overnight.

The weight obtained of hexamethylenediamine succinate salt is 145.7 g (i.e., an experimental yield of 88%). A 10% by weight aqueous solution of this salt exhibits a pH of 7.

Examples 2 to 6 and C1 to C6

The letter C indicates that comparative examples are concerned.

Examples 2 to 6 and C2, C3 and C5 are prepared in a way similar to that described in Example 1. For all of these salts, the pH of a 10% by weight aqueous solution is approximately 7.

The Comparative Examples C1, C4 and C6 are not carried out according to the procedure described above. The diamines of Examples C1 and C4 are used directly during the clay swelling test described below. The polyacrylic acid (Mn 2000 g/mol) of Example C6 is neutralized during the preparation of the formulation of the clay swelling test by addition of a stoichiometric amount, as carboxylic acid function group, of hexamethylenediamine amine functional group.

The compositions are summarized in Table 1:

TABLE 1

| | Examples | | | | | | | | | | | |
|---|---|---|---|---|---|---|---|---|---|---|---|---|
| | C1 | C2 | C3 | C4 | C5 | C6 | 1 | 2 | 3 | 4 | 5 | 6 |
| Acid | | | | | | | | | | | | |
| Hydrochloric acid | x | | x | | | | | | | | | |
| Formic acid | | x | | | | | | | | | | |
| Adipic acid | | | | x | x | | | | | | | |
| Polyacrylic acid | | | | | | x | | | | | | |
| Succinic acid | | | | | | | x | x | | | | |
| Methylglutaric acid | | | | | | | | | x | | x | |

TABLE 1-continued

| | Examples | | | | | | | | | | | |
|---|---|---|---|---|---|---|---|---|---|---|---|---|
| | C1 | C2 | C3 | C4 | C5 | C6 | 1 | 2 | 3 | 4 | 5 | 6 |
| Glutaric acid | | | | | | | | | | x | | |
| AGS | | | | | | | | | | | | x |
| Diamine | | | | | | | | | | | | |
| HMD | x | x | x | | | | x | x | x | | | |
| MPMD | | | | x | x | | | | | x | x | x |

Clay Swelling Test (Hot Roll Test):

The swelling of the clays is determined by a hydration test of 16 h in a roller oven at 60° C. The gelling limit is determined by direct observation of the samples after a rest time of 4 h at ambient temperature.

The various clay-swelling inhibitors are measured out at 1% of active amine in deionised water. Variable masses of API clay are added to 20 ml of fluid containing the inhibitor, in order to determine the gelling limit for each swelling inhibitor.

The rheological properties of the samples thus prepared are also characterized by a rheology measurement as described previously and the plastic viscosity and yield point parameters are determined using the Bingham equation. For the purpose of comparing the relative properties of the various swelling inhibitors, the rheological properties are given for an identical clay concentration of 37.5 g per 100 ml of fluid.

The test results and also the rheological properties are reported in Table 2 below for Examples 1 to 6 and the Comparative Examples C1 to C6.

TABLE 2

| Examples | Counterion | Diamine* | Gelling limit (g/100 ml) | Plastic viscosity PV (mPa · s, at 37.5 g/100 ml) | Yield point YP (Pa, at 37.5 g/100 ml) |
|---|---|---|---|---|---|
| C1 | chloride | HMD | 37.5 | 20 | 22 |
| C2 | formate | HMD | 35.0 | 22 | 24 |
| C3 | adipate | HMD | 32.5 | 33 | 33 |
| 1 | succinate | HMD | 32.5 | 20 | 20 |
| 2 | methylglutarate | HMD | 32.5 | 24 | 21 |
| C4 | chloride | MPMD | 37.5 | 18 | 15 |
| C5 | adipate | MPMD | 35.0 | 39 | 43 |
| C6 | polyacrylate | MPMD | 30.0 | 91 | 110 |
| 3 | succinate | MPMD | 37.5 | 33 | 24 |
| 4 | glutarate | MPMD | 37.5 | 26 | 18 |
| 5 | methylglutarate | MPMD | 40.0 | 22 | 17 |
| 6 | AGS | MPMD | 37.5 | 45 | 23 |

*Diamine at 1% by weight.

The lower the yield point, the better the performance of the clay-swelling inhibitor. A high gelling limit and a low viscosity are also an advantage.

The use of a salt of linear diacid $C_6$ in its main chain (i.e., the adipic acid of Examples C3 and C5) brings about a very significant deterioration in the inhibition properties desired, as well as the use of a polyacid, such as polyacrylic acid (Example C6).

On the other hand, it appears that the use of salts of organic diacids according to the invention makes it possible to provide a compromise in properties which is of high economic value:

to maintain the properties of inhibition of clay swelling at levels comparable to the reference tests C1, C2 and C4,
to avoid the use of chlorides, which have a deleterious effect on the cements used in the field,
to prevent the accidental release of volatile organic monoacids, such as formic acid, in the event of acidification of the medium.

The invention claimed is:

1. A method for inhibiting swelling of clays in an aqueous medium containing argillaceous particles, comprising:
   adding to the aqueous medium a salt obtained by reaction between a diamine and a dicarboxylic acid chosen from at least one member of the group consisting of succinic acid, glutaric acid, and methylglutaric acid,
   wherein the diamine is chosen from 2-methylpentamethylenediamine and 1,6-diaminohexane.

2. The method according to claim 1, wherein the diacid comprises succinic acid.

3. The method according to claim 2, wherein the diacid comprises glutaric acid.

4. The method according to claim 1, wherein the diacid comprises methylglutaric acid.

5. The method according to claim 1, wherein the diamine comprises 2 methylpentamethylenediamine.

6. The method according to claim 1, comprising adding to the aqueous medium a mixed salt of one or more of said diamines and of at least two different said diacids.

7. The method according to claim 1, wherein the aqueous medium is a drilling fluid or a hydraulic fracturing fluid.

8. The method of claim 1, further comprising a drilling process comprising drilling through a subterranean formation comprising argillaceous rock and injecting a drilling fluid composition comprising the salt obtained by the reaction between said diamine and said dicarboxylic acid into a drill pipe and adding to the aqueous medium the salt obtained by reaction between the diamine and the dicarboxylic acid within the subterranean formation.

9. The method of claim 1, further comprising a hydraulic fracturing process comprising injecting a hydraulic fracturing fluid composition comprising the salt obtained by reaction between the diamine and the dicarboxylic acid into a subterranean rock formation comprising argillaceous rock and adding to the aqueous medium the salt obtained by reaction between the diamine and the dicarboxylic acid within the subterranean formation.

* * * * *